United States Patent Office 3,261,802
Patented July 19, 1966

3,261,802
VINYL CHAIN-STOPPED ORGANOPOLYSILOXANE
AND FERRIC OXIDE MASTERBATCHES MILLED
WITH ORGANOPOLYSILOXANE COMPOSITIONS
William J. Bobear, Latham, N.Y., assignor to General
Electric Company, a corporation of New York
No Drawing. Filed Dec. 31, 1962, Ser. No. 248,283
5 Claims. (Cl. 260—37)

The present invention relates to a method for making organopolysiloxane elastomers having improved resistance to heat age. More particularly, the present invention relates to a method for incorporating iron oxide into organopolysiloxane compositions convertible to the cured, solid, elastic state and to the products produced thereby.

Organopolysiloxane elastomers are generally employed in applications requiring the service of materials possessing high temperature stability over extended periods of time. At temperatures exceeding 600° F., however, organopolysiloxane elastomers often suffer material weight loss and an adverse change in physical properties. Heat age of the elastomer can be substantially improved, if certain materials known as heat age additives, such as iron oxide, or metal salts such as cerium naphthenate are incorporated into the elastomeric composition prior to cure.

Prior to the present invention, iron oxide was generally incorporated into organopolysilixane polymers in the form of a powder while the polymer was being milled. Although organopolysiloxane elastomers having improved resistance to heat age are obtained by this method, inspection of the elastomer often showed that the iron oxide was distributed irregularly throughout the polymer in the form of agglomerates. These iron oxide agglomerates can adversely affect the tensile strength of the elastomer. In addition, because the iron oxide is sometimes not distributed uniformly throughout the polymer, "windows" can be formed in the elastomer, i.e., areas free of iron oxide. Attempts to reduce the size of the iron oxide agglomerates by milling the iron oxide powder with an oil carrier such as a polydimethylsiloxane oil, and introducing the iron oxide into the organopolysiloxane polymer in the form of a masterbatch also failed to achieve optimum results. The oil was found to act like a plasticizer while in the polymer, which increased the permanent set in the resulting elastomer. Milling of the iron oxide powder into the polymer with a tight mill also was found to be unsatisfactory for both economic and technical reasons.

The present invention is based on the discovery that a masterbatch of iron oxide and an alkenyl chain-stopped organopolysiloxane can be employed to make organopolysiloxane elastomers having both outstanding heat age resistance and improved physical properties.

In accordance with the present invention, there is provided a method for making organopolysiloxane compositions comprising (A) from about 0.1 to about 20 parts of iron oxide, (B) 100 parts of an organopolysiloxane having a viscosity of at least 100,000 centipoises at 25° C. of the formula:

(1)   (R)$_a$SiO$_{4-a/2}$ (C) and from 10 to 300 parts of a filler, which method involves the steps of, (1) Forming a mixture of iron oxide and an alkenyl chain-stopped organopolysiloxane free of iron oxide agglomerates greater than 50 microns in diameter, where the iron oxide is utilized in a proportion of from about 0.1 part to about 4.5 parts per part of said alkenyl chain-stopped organopolysiloxane which has a viscosity of less than 100,000 centipoises at 25° C. and consists essentially of chemically combined diorganosiloxy units having the formula:

(2)  (R)$_2$SiO and terminated with chemically combined units of the formula:

(3) 

$$R'SiO_{.5}$$

(with R above and R below)

(2) Milling a mixture comprising (D) from 1 to 200 parts of said mixture of step (1), (E) 100 parts of said organopolysiloxane of (B), (F) 10 to 300 parts of said filler of (C), where R is a member selected from monovalent hydrocarbon radicals, halogenated monovalent hydrocarbon radicals and cyanoalkyl radicals, R' is a monovalent olefinically unsaturated hydrocarbon radical and $a$ is equal to from 1.9 to 2.01, inclusive.

Radicals included by R of the above formulae are aryl radicals, and halogenated aryl radicals such as phenyl, chlorophenyl, xylyl, tolyl, etc.; aralkyl radicals such as phenylethyl, benzyl, etc.; aliphatic, haloaliphatic and cycloaliphatic, such as alkyl, alkenyl, cycloalkyl, haloalkyl, including methyl, ethyl, propyl, chlorobutyl, fluoropropyl, cyclohexyl, etc.; cyanoalkyl radicals such as cyanoethyl, cyanopropyl, cyanobutyl, etc. Radicals included by R' of Formula 2 are vinyl, allyl, propenyl, cyclohexenyl, etc., R and R' can be all the same radical respectively, or any two or more of the aforementioned R and R' radicals; R is preferably methyl, and R' is preferably vinyl.

Iron oxides that can be employed in the practice of the present invention are Fe$_2$O$_3$, for example, red iron oxide, or mixtures of iron oxides containing at least a major proportion of Fe$_2$O$_3$. For example, various mixtures of Fe$_2$O$_3$ and FeO have been found operable. Iron oxide in the form of a hydrated Fe$_2$O$_3$, commonly known as yellow iron oxide, is also operable.

The alkenyl chain-stopped organopolysiloxanes that can be employed in the practice of the invention to form the "iron oxide masterbatch" can have a viscosity of between 1000 centipoises to 40,000 centipoises at 25° C., while a preferred viscosity is between 3,000 centipoises to about 10,000 centipoises at 25° C. However, a viscosity from 300 to less than about 100,000 centipoises can provide for effective results. These alkenyl chain-stopped fluids can be made by equilibrating alkenyldiorganosiloxy chain-stopping units of Formula 3 as provided, for example, by 1,4-divinyloctamethyltetrasiloxane, tetramethyldivinyldisiloxane, 1,4-diallyloctamethyltetrasiloxane, etc., with a cyclic polysiloxane having the formula:

(4) 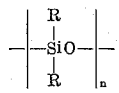

where R is as defined above and $n$ is an integer equal to from 3 to 10, inclusive. However, the alkenyl chain-stopped organopolysiloxane can also contain chemically combined organosiloxy units, (5)  RSiO$_{1.5}$ where R is as defined above, in an amount sufficient to provide a ratio of from 1.9 to 2.01 R radicals, per silicon atom, of the alkenyl chain-stopped organopolysiloxane. The equilibration of the aforesaid alkenyldiorganosiloxy units with cyclic polysiloxanes of Formula 4 can be accomplished in accordance with conventional equilibration procedures utilizing an equilibration catalyst such as potassium hydroxide, sulfuric acid, etc. Alternate methods for making the alkenyl chain-stopped polydiorganosiloxanes are equilibrating the aforesaid alkenyldiorganosiloxy units with organosiloxane hydrolyzate having a ratio of about 2 organo radicals per silicon atom in which the organo radicals are attached to silicon by carbon-silicon linkages and are the same as the R radicals as defined above.

The fillers that are employed in the organopolysiloxane compositions convertible to the cured, solid, elastic state are known to the art as reinforcing and semi-reinforcing fillers. The reinforcing fillers, such as the silica fillers, including fumed silica, precipitated silica and the like, are structure inducing and depending upon their manufacture, can contain or be free of hydroxyl groups either in the form of adsorbed moisture, or bonded to silicon atoms. These structure inducing fillers can be modified such as, for example, by the introduction of silicon-bonded alkoxy groups or silicon-bonded alkoxy radicals in place of some hydroxy radicals, resulting in certain advantages, such as decreased structure, when incorporated into the organopolysiloxane polymer.

The preferred silica filler of the present invention is fumed silica filler made by fuming processes including the vapor phase burning of silicon tetrachloride or ethylsilicate, an example being what is known to the trade as Cab-O-Sil. Examples of other silica reinforcing fillers may be found described in U.S. Patents 2,541,137, 2,610,167 and 2,657,149. Such fillers may be slightly acidic or alkaline (that is, have pH's below or above 7) depending upon the method of manufacture. Examples of semi-reinforcing or usually non-structure forming types, are titanium oxide, lithopone, calcium carbonate, iron oxide, and diatomaceous earth.

The organopolysiloxane polymers of Formula 1 are well known in the art, and are shown, for example, in Agens Patent 2,448,756, Sprung et al. Patent 2,448,556, Sprung Patent 2,484,595, Krieble et al. Patent 2,457,688, Marsden Patent 2,521,528, Hyde Patent 2,490,357, and Warrick Patent 2,541,137. It will, of course, be understood by those skilled in the art that these organopolysiloxane polymers can contain the same or different silicon-bonded organic substituents (e.g., methyl, ethyl, propyl, vinyl, allyl, phenyl, tolyl, xylyl, benzyl, phenylethyl, naphthyl, chlorophenyl, cyanoethyl, both methyl and phenyl, etc. radicals) connected to the silicon atoms by carbon-silicon linkages.

The polymers can be viscous masses or gummy solids, depending upon the state of condensation of the starting organopolysiloxanes, polymerizing agents, etc., and can be prepared by condensation of a liquid organopolysiloxane containing an average of about 1.9, preferably from about 1.98 to 2.01 organic groups per silicon atom. The polymerizing agents that can be employed are well known in the art and include, for instance, ferric chloride hexahydrate, phenyl phosphoryl chloride; alkaline condensing agents such as potassium hydroxide, sodium hydroxide, etc.

The starting organopolysiloxanes used to make the organopolysiloxane polymers of Formula 1 consist essentially of units of the structural formula $R_2SiO$, where R is as previously defined. For example, the organopolysiloxanes of Formula 1 can consist essentially of chemically combined $(CH_3)_2SiO$ units, or a copolymer of dimethylsiloxane with a minor amount (e.g., from 1 to 20 or more mole percent) of chemically combined units such as $(C_6H_5)(CH_3)SiO$, $(C_6H_5)_2SiO$ or

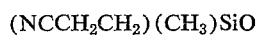

units or mixtures thereof.

Where alkenyl radicals are attached to silicon by carbon-silicon linkages in the polymers of Formula 1, it is preferable that the alkenyl radicals (for instance, vinyl groups, allyl groups, etc.) be present in an amount equal to from 0.05 to 2 mole percent of the total number of organic radicals in the organopolysiloxane polymer that are attached to silicon through carbon-silicon linkages.

Various curing agents can be employed with the organopolysiloxane polymers of Formula 1. Among such curing agents there is included benzoyl peroxide, tertiary butyl perbenzoate, bis-(2,4-dichlorobenzoyl)peroxide, etc. These curing agents can be present in amounts ranging from about 0.1 to as high as 4 to 8 percent or more, by weight, based on the weight of the organopolysiloxane polymer. High energy electron irradiation, γ-radiation, etc., without curing agents, can also be employed for vulcanizing purposes.

In the practice of the invention, a masterbatch of iron oxide and the alkenyl chain-stopped organopolysiloxane oil is formed which is preferably accomplished by milling a mixture of the iron oxide and the alkenyl-stopped organopolysiloxane. Standard milling equipment such as a paint mill, ink mill, ball mill and the like, can be utilized to effect the grinding of the iron oxide. The grinding of the mixture of the oil and iron oxide is continued until a masterbatch of iron oxide and oil is formed having the iron oxide agglomerates below a size equivalent to at least above number 4 on a North Standard Scale of a Hegman Grind Gauge, which is equal to less than about 50 microns in size.

The organopolysiloxane compositions convertible to the cured, solid, elastic state of the present invention can be made by adding to the above-described masterbatch of iron oxide and alkenyl-stopped organopolysiloxane, an organopolysiloxane polymer convertible to the cured, solid, elastic state, while it is milled, along the filler and other additives such as curing catalysts, pigments and the like. The order of addition of the various ingredients to the polymer is not critical, but it is preferred to add the curing catalyst after the masterbatch and the filler have been added. Thereafter, the resulting organopolysiloxan composition can be molded, calendered or extruded and used in various applications. The curing temperatures that can be employed can vary in the range of between about 80° C. to 200° C. or higher.

In order that those skilled in the art may better understand how the present invention can be practiced, the following examples are given by way of illustration and not by way of limitation. All parts are by weight.

EXAMPLE 1

An alkenyl chain-stopped organopolysiloxane in the form of a vinyl chain-stopped polydimethylsiloxane was made by equilibrating a mixture of 100 parts of octamethylcyclotetrasiloxane and 44 parts of tetramethyldivinyldisiloxane. The mixture was equilibrated by utilizing 100 parts of potassium hydroxide per million parts of organopolysiloxane at temperatures in the range of from 150° C. to 160° C. for 6 hours. After the product was stripped of volatiles there was obtained a vinyl chain-stopped polydimethylsiloxane oil having a viscosity in the range of about 3,000 centipoises at 25° C.

A mixture of 75 parts of red iron oxide and 25 parts of the above vinyl chain-stopped polydimethylsiloxane oil was then ground in a paint mill to a North Standard grind of 4 to 5, as determined by a Hegman Grind Gauge. A proportion of 2.67 parts of the resulting masterbatch was then milled into 100 parts of a mixture consisting of 66 parts of a methylphenyl copolymer, 26 parts of fumed silica filler and 8 parts of a methoxy-stopped polydimethylsiloxane having a viscosity of about 10 centipoises at 25° C. Into the resulting organopolysiloxane composition there was also incorporated, 0.4 part of benzoyl peroxide.

The methylphenyl copolymer utilized in the above organopolysiloxane composition was made as follows: 100 parts by weight of octamethylcyclotetrasiloxane, 15 parts of octaphenylcyclotetrasiloxane and .04 part of decamethyltetrasiloxane were heated and agitated for 7½ hours at 150° C. to 160° C. in the presence of 0.001 part of potassium hydroxide. The resulting product was stripped. A highly viscous benzene soluble mass was obtained having a viscosity of about 6,000,000 centipoises at 25° C.

In addition to the above-described organopolysiloxane composition convertible to the cured, solid, elastic state made in accordance with the invention, a similar organopolysiloxane composition was prepared following the same procedure, except that 2 parts of iron oxide powder was incorporated into the organopolysiloxane composition in place of the masterbatch. In addition, another organopolysiloxane composition was prepared following the same procedure, except that a polydimethylsiloxane oil chain-stopped with trimthylsiloxy units having a viscosity of about 3,000 centipoises at 25° C. was substituted for the vinyl-stopped polydimethylsiloxane utilized in the masterbatch made in accordance with the practice of the present invention.

The respective organopolysiloxane compositions were then formed into sheets on a rubber mill from which test slabs were cut. A number of test slabs of each composition were initially press-cured at 275° F. for 10 minutes. A press-cured slab of each organopolysiloxane composition was then bonded to an uncured slab of the same composition for an additional 10 minutes at 275° F. at 100 p.s.i. to form composite slabs. Some of the press-cured slabs were then post-heated for 4 hours at 480° F. and 24 hours at 600° F. Other press-cured slabs were post-heated for 4 hours at 480° F. and 50 hours at 600° F.

After the various heating periods, the respective press-cured slabs were evaluated for "H," hardness (Shore A), "T," tensile (p.s.i.), and "E," elongation (percent). The composite slabs were also evaluated for bond strength. One inch strips were peeled apart on a Scott tester, using a pull of 2 inches per minute. A bond strength, "B.S." of 10 p.i. (width) or better would show that the particular organopolysiloxane composition would be suitable for applications where rubber to rubber bonding was essential, such as in jet starter hoses. Table I below shows the results obtained with the compositions made in accordance with the present invention, "masterbatch," as compared to the compositions made by employing powdered iron oxide "powder," and the trimethylsiloxy chain-stopped polydimethylsiloxane "oil," in accordance with the method of the prior art.

Table I

|  | Press Cured +4 hrs./480° F. +24 hrs./600° F. | | | Press Cured +4 hrs./480° F. +50 hrs./600° F. | | | B.S./p.i. |
| --- | --- | --- | --- | --- | --- | --- | --- |
|  | H | T | E | H | T | E |  |
| Masterbatch | 63 | 655 | 220 | 68 | 708 | 170 | 18–20 |
| Powder | 68 | 620 | 150 | Too Brittle to Test | | | 18–20 |
| Oil | | | | | | | <10 |

In addition to the results shown in Table I above, it was found that the organopolysiloxane composition made with the polydimethylsiolxane oil chain-stopped with trimethylsiloxy units gave heat age results substantially equivalent to the compositions made in accordance with the present invention. However, the compositions made with the trimethylsiloxy chain-stopped oil, in addition to failing the bond strength test, formed elastomers that exhibited an excess amount of permanent set.

EXAMPLE 2

An organopolysiloxane composition of the present invention is made in accordance with the procedure of Example 1, except that a masterbatch is utilized which is composed of a mixture of 25 parts of a vinyl chain-stopped polydimethylsiloxane having a viscosity of about 40,000 centipoises at 25° C. and 75 parts of red iron oxide. It is found that test slabs made in accordance with the procedure of Example 1 exhibit substantially the same resistance to heat age as shown by the compositions of Example 1.

Those skilled in the art would know that based on the above results, the method of the present invention provides for the production of organopolysiloxane elastomers having superior heat age resistance. In addition, the elastomers of the present invention can be employed in a variety of applications requiring superior rubber to rubber bonding.

While the foregoing examples have of necessity been limited to only a few of the very many variables within the scope of the present invention, it should be understood that the present invention covers a much broader class of organopolysiloxane compositions made from organopolysiloxane polymers shown in Formula 1 along with the alkenyl chain-stopped organopolysiloxanes consisting essentially of chemically combined units of Formula 2 and terminated with chemically combined units of Formula 3.

What I claim as new and desire to secure by Letters Patent of the United States is:

1. A method for making organopolysiloxane compositions comprising (A) from about 0.1 to about 20 parts of ferric oxide, (B) 100 parts of an organopolysiloxane having a viscosity of at least 100,000 centipoises at 25° C. of the formula:

$$(R)_a SiO_{4-a/2}$$

and (C) from 10 to 300 parts of a filler, which method comprises milling a mixture comprising (B), (C), and from about 1 to about 200 parts of a ferric oxide masterbatch consisting essentially of a mixture of ferric oxide and a vinyl chain-stopped organopolysiloxane free of ferric oxide agglomerates greater than 50 microns in diameter, where the ferric oxide is utilized in a proportion of from about .01 part to about 4.5 parts per part of said vinyl chain-stopped organopolysiloxane which has a viscosity of less than 100,000 centipoises at 25° C. and consists essentially of chemically combined diorganosiloxy units having the formula:

$$(R)_2 SiO$$

and terminated with chemically combined units of the formula:

$$R'\underset{R}{\overset{R}{\underset{|}{Si}}}O_{.5}$$

where R is a member selected from the class consisting of monovalent hydrocarbon radicals, halogenated monovalent hydrocarbon radicals and cyanoalkyl radicals, R' is a vinyl radical and $a$ is equal to from 1.9 to 2.01, inclusive.

2. A method in accordance with claim 1, which comprises milling a mixture which has from 1 to 8 parts of a peroxide curing catalyst, per 100 parts of said organopolysiloxane of (B).

3. A method in accordance with claim 1, where said filler is fumed silica.

4. A method in accordance with claim 1, where said vinyl chain-stopped organopolysiloxane has a viscosity between 3,000 to 10,000 centipoises at 25° C.

5. A method in accordance with claim 1, where said organopolysiloxane of (B) consists essentially of chemically combined dimethylsiloxy units.

References Cited by the Examiner

UNITED STATES PATENTS 2,803,619   8/1957   Dickmann.
3,061,565  10/1962   Collings _____ 260—45.75
3,096,303   7/1963   Caprino et al.

MORRIS LIEBMAN, Primary Examiner.

J. W. BEHRINGER, Examiner.

J. H. DERRINGTON, Assistant Examiner.